US010857938B2

(12) United States Patent
Lujan et al.

(10) Patent No.: US 10,857,938 B2
(45) Date of Patent: Dec. 8, 2020

(54) AUTONOMOUS VEHICLE IDENTIFICATION (71) Applicant: GM GLOBAL TECHNOLOGY OPERATIONS LLC, Detroit, MI (US)

(72) Inventors: Eric Lujan, San Francisco, CA (US); Kyle Vogt, San Francisco, CA (US); Stephanie Olivia Engle, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 145 days.

(21) Appl. No.: 16/112,871

(22) Filed: Aug. 27, 2018

(65) Prior Publication Data
US 2020/0062172 A1   Feb. 27, 2020

(51) Int. Cl.
*B60Q 1/50* (2006.01)
*E05F 15/73* (2015.01)
(Continued)

(52) U.S. Cl.
CPC ............ *B60Q 1/50* (2013.01); *B60Q 5/00* (2013.01); *E05F 15/73* (2015.01); *G05D 1/021* (2013.01); *B60J 1/12* (2013.01); *E05Y 2900/55* (2013.01)

(58) Field of Classification Search
CPC .......... B60Q 1/50; G05D 1/021; E05F 15/73; B60W 30/10; B60W 30/16
See application file for complete search history.

(56) References Cited

U.S. PATENT DOCUMENTS

| 8,031,085 B1 | 10/2011 | Anderson |
| 8,954,252 B1 | 2/2015 | Urmson et al. |

(Continued)

FOREIGN PATENT DOCUMENTS

| DE | 102013012891 A1 | 2/2015 |
| DE | 102017201289 A1 | 7/2018 |
| WO | 2015055638 A1 | 4/2015 |

OTHER PUBLICATIONS

TouristTravelVideos, "Atlanta Airport Train Ride @ Hartsfield-Jackson Atlanta International", Aug. 9, 2016, https://www.youtube.com/watch?v=0js9sF9XWS0 (Year: 2016).*
(Continued)

*Primary Examiner* — Rami Khatib
(74) *Attorney, Agent, or Firm* — Medley, Behrens & Lewis, LLC (57) ABSTRACT

Various technologies described herein pertain to controlling an autonomous vehicle to provide indicators to distinguish the autonomous vehicle from other autonomous vehicles in a fleet. The autonomous vehicle includes a vehicle propulsion system, a braking system, a notification system, and a computing system. The notification system outputs an indicator that is perceivable external to the autonomous vehicle. The computing system receives data specifying an identity of a passenger to be picked up by the autonomous vehicle. Moreover, the computing system controls at least one of the vehicle propulsion system or the braking system to stop the autonomous vehicle for passenger pickup. Further, the computing system controls the notification system to output the indicator; a characteristic of the indicator outputted by the notification system is controlled based on the identity of the passenger to be picked up and whether the autonomous vehicle is stopped for passenger pickup.

20 Claims, 9 Drawing Sheets

(51) Int. Cl.
*B60Q 5/00* (2006.01)
*G05D 1/02* (2020.01)
*B60J 1/12* (2006.01)

(56) References Cited

U.S. PATENT DOCUMENTS

| | | |
|---|---|---|
| 9,475,422 B2 | 10/2016 | Hillis et al. |
| 9,694,736 B2 | 7/2017 | Williams et al. |
| 9,804,599 B2 | 10/2017 | Kentley-Klay et al. |
| 9,953,538 B1 | 4/2018 | Matthiesen et al. |
| 2015/0268665 A1 | 9/2015 | Ludwick et al. |
| 2015/0336502 A1 | 11/2015 | Hillis et al. |
| 2017/0088035 A1* | 3/2017 | Williams ............... B60Q 1/50 |
| 2017/0124781 A1* | 5/2017 | Douillard ............ G05D 1/0268 |
| 2018/0072218 A1 | 3/2018 | Sweeney et al. |
| 2018/0338229 A1* | 11/2018 | Nemec ................ B60W 30/181 |
| 2018/0354411 A1* | 12/2018 | Shmueli Friedland ..................... G05D 1/0212 |
| 2019/0015976 A1 | 1/2019 | Sweeney et al. |
| 2019/0111838 A1* | 4/2019 | Hanson ................... G07C 5/08 |
| 2019/0137290 A1* | 5/2019 | Levy ................... G05D 1/0214 |
| 2019/0197430 A1* | 6/2019 | Arditi ................ G01C 21/3438 |
| 2019/0337442 A1* | 11/2019 | Sorokin ................ B60Q 1/085 |

OTHER PUBLICATIONS

"International Search Report for PCT Patent Application No. PCT/US2019/048082", dated Jan. 31, 2020, 5 Pages.
"Written Opinion of the International Searching Authority for PCT Patent Application No. PCT/US2019/048082", dated Jan. 31, 2020, 6 Pages.

* cited by examiner

AUTONOMOUS VEHICLE IDENTIFICATION

BACKGROUND

An autonomous vehicle is a motorized vehicle that can operate without human conduction. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems.

According to an exemplary interaction scenario, a passenger who desires to be picked up for a ride may hail an autonomous vehicle by sending a request utilizing a computing device (e.g., a mobile computing device). Responsive to the request, a particular autonomous vehicle from a fleet of autonomous vehicles can be assigned to provide a ride for the passenger to be picked up. The autonomous vehicle, for instance, may need to travel to a pickup location to meet the passenger to be picked up. However, conventional autonomous vehicles may be difficult to distinguish, especially when many of the autonomous vehicles in the fleet have similar appearances. Thus, identification of the autonomous vehicle assigned to provide the ride for the passenger may be challenging and time consuming. Identification of the autonomous vehicle may be particularly difficult in a high traffic area where a number of autonomous vehicles from the fleet are being concurrently hailed by different passengers. Moreover, such distinguishing of a vehicle from a fleet is particularly problematic for autonomous vehicles as compared to conventional human driven vehicles, since there is no driver to communicate that the autonomous vehicle has been assigned to provide the ride to the particular passenger. Thus, for instance, a passenger to be picked up may not know which autonomous vehicle to attempt to enter when more than one autonomous vehicle is within proximity of the passenger. Further, a passenger may attempt to enter into an incorrect autonomous vehicle; if a passenger were to enter into an improper autonomous vehicle, overall fleet planning can be detrimentally impacted.

Moreover, due to the nature of autonomous vehicles (e.g., the lack of a driver to communicate with a passenger to be picked up), it may be unclear to the passenger to be picked up when it is safe to attempt to enter into the autonomous vehicle. For instance, the autonomous vehicle may be slowing to approach a location at which the passenger is to be picked up. While the autonomous vehicle may momentarily be stopped during a given time period, it may resume motion to continue traveling to the pickup location. Thus, the passenger may attempt to enter into the autonomous vehicle prior to the autonomous vehicle being fully stopped for passenger pickup.

SUMMARY

The following is a brief summary of subject matter that is described in greater detail herein. This summary is not intended to be limiting as to the scope of the claims.

Described herein are various technologies that pertain to controlling an autonomous vehicle to provide indicators to distinguish the autonomous vehicle from other autonomous vehicles in a fleet. With more specificity, described herein are various technologies pertaining to controlling a notification system of an autonomous vehicle configured to output an indicator that is perceivable external to the autonomous vehicle. The indicator is controlled as a function of an identity of a passenger to be picked up as well as a state of the autonomous vehicle (e.g., whether the autonomous vehicle is stopped for passenger pickup).

As indicated above, the notification system of the autonomous vehicle is configured to output an indicator that is perceivable external to the autonomous vehicle. Pursuant to an example, the notification system can include a lighting system configured to emit a visual indicator viewable external to the autonomous vehicle. According to another example, the notification system can include a sound system configured to emit an audible indicator perceivable external to the autonomous vehicle. However, it is contemplated that both a visual indicator and an audible indicator can be outputted by the notification system (e.g., during the same time period, during different time periods); thus, the notification system can include both the lighting system and the sound system. The indicator outputted by the notification system can signify to a passenger to be picked up (e.g., while the passenger is outside the autonomous vehicle) that the autonomous vehicle is assigned to provide a ride to the passenger. Moreover, the indicator outputted by the notification system can specify other information to the passenger, namely, information pertaining to the state of the autonomous vehicle.

According to various embodiments, an autonomous vehicle includes a vehicle propulsion system, a braking system, a computing system, and the notification system. The computing system is in communication with the vehicle propulsion system, the braking system, and the notification system. The computing system can receive data specifying an identity of a passenger to be picked up by the autonomous vehicle. Moreover, the computing system can control at least one of the vehicle propulsion system or the braking system to stop the autonomous vehicle for passenger pickup. Further, the computing system can control the notification system of the autonomous vehicle to output an indicator. A characteristic of the indicator outputted by the notification system can be controlled by the computing system based on the identity of the passenger to be picked up and whether the autonomous vehicle is stopped for passenger pickup. For example, the characteristic of the indicator can be predefined by the passenger to be picked up. Pursuant to another example, the characteristic of the indicator can be selected by the computing system; following this example, data specifying the characteristic of the indicator selected for the passenger to be picked up can be transmitted by the computing system (e.g., from the autonomous vehicle to a computing device of the passenger such that the data can be displayed to the passenger).

Thus, for instance, it is contemplated that a characteristic of a visual indicator emitted by a lighting system viewable external to the autonomous vehicle can be controlled by the computing system, a characteristic of an audible indicator perceivable external to the autonomous vehicle emitted by a sound system can be controlled by the computing system, or a combination thereof. Moreover, according to various embodiments, it is contemplated that the computing system can control a window actuator to lower a window when the autonomous vehicle is stopped for passenger pickup and/or a door lock to unlock when the autonomous vehicle is stopped for passenger pickup. The window can be lowered to allow for an audible indicator to be perceivable external to the autonomous vehicle, for instance. Further, the computing system can lower the window and/or unlock the door lock when the passenger is detected (e.g., by the autonomous vehicle) to be within a predetermined distance from the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to controlling an autonomous vehicle to provide an indicator, which is perceivable external to the autonomous vehicle, to identify the autonomous vehicle to a passenger to be picked up, where the indicator is controlled as a function of an identity of the passenger to be picked up and a state of the autonomous vehicle, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As referred to herein, a "passenger to be picked up" refers to a passenger who has requested a ride in an autonomous vehicle (or for whom a ride in an autonomous vehicle has otherwise been requested) and has yet to enter into an autonomous vehicle for the requested ride.

Figure 1:
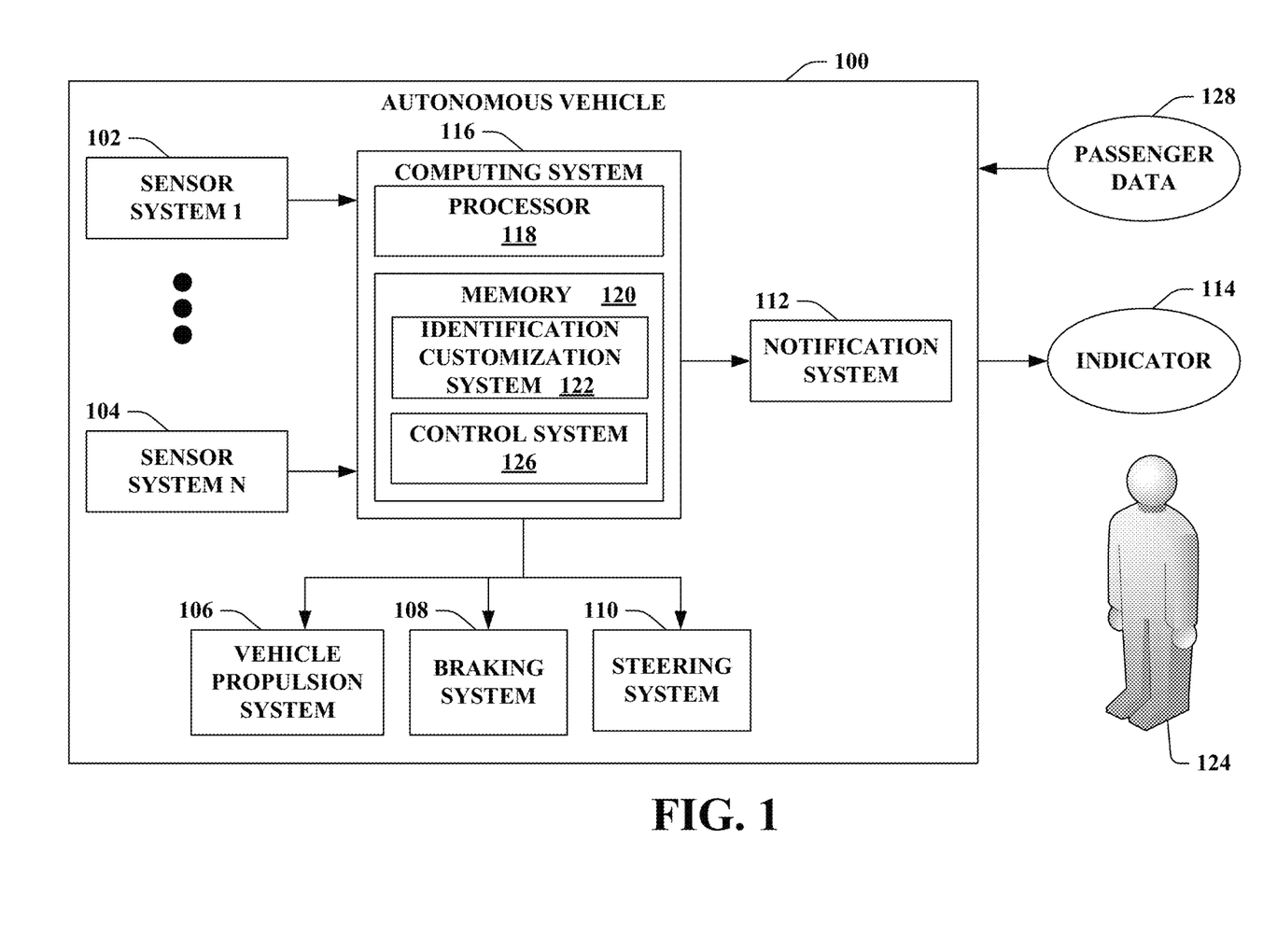
FIG. 1 illustrates a functional block diagram of an exemplary autonomous vehicle.

Referring now to the drawings, FIG. 1 illustrates an autonomous vehicle 100. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 100. For example, the sensor system 1 102 may be a lidar sensor system and the sensor system N 104 may be a camera (image) system. Other exemplary sensor systems included in the sensor systems 102-104 can include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 106, a braking system 108, and a steering system 110. The vehicle propulsion system 106 may be an electric motor, an internal combustion engine, or a combination thereof. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 includes a notification system 112. The notification system 112 is configured to output an indicator 114. The indicator 114 outputted by the notification system 112 is perceivable external to the autonomous vehicle 100. According to an example, the notification system 112 can include a lighting system that emits a visual indicator viewable external to the autonomous vehicle 100. According to yet another example, the notification system 112 can include a sound system that can emit an audible indicator perceivable external to the autonomous vehicle 100. Further, it is contemplated that the notification system 112 can include both a lighting system and a sound system. Thus, the indicator 114 outputted by the notification system 112 can be a visual indicator, an audible indicator, or a combination thereof. Pursuant to an illustration in which the notification system 112 includes both a lighting system and a sound system, it is to be appreciated that the notification system 112 can concurrently emit a visual indicator and an audible indicator during a common time period (e.g., the indicator 114 can include the visual indicator and the audible indicator) or the notification system 112 can emit a visual indicator and an audible indicator during different time periods (e.g., the indicator 114 outputted during a particular time period can be one of the visual indicator or the audible indicator). For instance, the identification customization system 122 can cause the notification system 112 to emit either a visual indicator or an audible indicator based on factors such as time of day, location of the autonomous vehicle, preference of the passenger 124, a combination thereof, or the like.

The autonomous vehicle 100 additionally includes a computing system 116 that is in communication with the sensor systems 102-104, the vehicle propulsion system 106, the braking system 108, the steering system 110, and the notification system 112. The computing system 116 includes a processor 118 and memory 120; the memory 120 includes computer-executable instructions that are executed by the processor 118. Pursuant to various examples, the processor 118 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 120 of the computing system 116 includes an identification customization system 122 that is configured to control the notification system 112 of the autonomous vehicle 100 to output the indicator 114. As will be described in greater detail below, the identification customization system 122 can control the indicator 114 outputted by the notification system 112 such that a characteristic of the indicator 114 is controlled based on an identity of a passenger 124 to be picked up and whether the autonomous vehicle 100 is stopped for passenger pickup. Thus, a characteristic of an indicator outputted by the notification system 112 can differ for the passenger 124 as compared to a differing passenger. According to an illustration, a pink light can be emitted for the passenger 124 while a purple light can be emitted for a differing passenger. Moreover, the identification customization system 122 can modify the characteristic of the indicator 114 over time based on a state of the autonomous vehicle 100. For instance, a pink light emitted for the passenger 124 can be flashing while the autonomous vehicle 100 is moving (prior to passenger pickup) and the pink light emitted for the passenger 124 can be solid while the autonomous vehicle 100 is stopped for passenger pickup.

The memory 120 additionally includes a control system 126. The control system 126 is configured to control at least one of the mechanical systems of the autonomous vehicle 100 (e.g., at least one of the vehicle propulsion system 106, the braking system 108, and/or the steering system 110). Moreover, the control system 126 can be configured to provide data corresponding to the control of the mechanical system(s) to the identification customization system 122. For instance, the control system 126 can provide data to the identification customization system 122 specifying the state of the autonomous vehicle 100 (e.g., whether or not the control system 126 has caused the mechanical system(s) to stop the autonomous vehicle 100 for passenger pickup). Thus, the identification customization system 122 can control the notification system 112 to output the indicator 114 based on the data corresponding to the control of the mechanical system(s) received from the control system 126.

Exemplary operation of the autonomous vehicle 100 is now set forth. The passenger 124 can hail an autonomous vehicle (e.g., utilizing a computing device (not shown) via a dispatch computing system (not shown)). Accordingly, the dispatch computing system can assign the autonomous vehicle 100 to provide a ride to the passenger 124; thus, the autonomous vehicle 100 can be caused to pick up the passenger 124. The autonomous vehicle 100 can receive passenger data 128 that specifies an identity of the passenger 124 to be picked up by the autonomous vehicle 100, amongst other information (e.g., a pickup location). The passenger data 128 can further specify a predefined characteristic of an indicator to be utilized by the autonomous vehicle 100 to identify the autonomous vehicle 100 to the passenger 124; however, in other embodiments, the passenger data 128 need not include such data concerning a predefined characteristic. The passenger data 128 can be received responsive to the autonomous vehicle 100 being assigned to pick up the passenger 124 (which in turn is responsive to the passenger 124 sending a request to hail an autonomous vehicle from a fleet of autonomous vehicles).

The passenger data 128 specifying the identity of the passenger 124 to be picked up by the autonomous vehicle 100 can be provided to the computing system 116. Moreover, the control system 126 can cause the vehicle propulsion system 106, the braking system 108, and the steering system 110 to travel to a pickup location. Further, the control system 126 can cause the vehicle propulsion system 106 and/or the braking system 108 to stop the autonomous vehicle 100 for passenger pickup. The identification customization system 122 can control the notification system 112 of the autonomous vehicle 100 to output the indicator 114, such that a characteristic of the indicator 114 outputted by the notification system 112 is controlled based on the identity of the passenger 124 to be picked up and whether the autonomous vehicle 100 is stopped for passenger pickup.

As noted above, the identification customization system 122 can control the notification system 112 to output an indicator having a first characteristic for a first passenger and can control the notification system 112 to output an indicator having a second characteristic for a second passenger. For instance, the identification customization system 122 can cause the notification system 112 to play a first song for the passenger 124 (when picking up the passenger 124), whereas the identification customization system 122 can cause the notification system 112 to play a different, second song for a differing passenger (when picking up the differing passenger).

Moreover, the identification customization system 122 can control the characteristic of the indicator 114 outputted by the notification system 112 to differ based on a state of the autonomous vehicle 100. For instance, while the autonomous vehicle 100 is still moving (e.g., the control system 126 is controlling the mechanical system(s) to slow the autonomous vehicle 100 or move the autonomous vehicle 100 to a pickup location), the characteristic of the indicator 114 can differ as compared to when the autonomous vehicle 100 has stopped for passenger pickup (e.g., the control system 126 is controlling the mechanical system(s) to stop the autonomous vehicle 100 for passenger pickup). Accordingly, the characteristic of the indicator 114 outputted by the notification system 112 can signify to the passenger 124 whether or not to attempt to enter into the autonomous vehicle 100.

According to an example, the characteristic of the indicator 114 output by the notification system 112 as controlled by the identification customization system 122 can be predefined by the passenger 124 to be picked up. For instance, the predefined characteristic can be specified in the passenger data 128 received by the autonomous vehicle 100. It is contemplated that the predefined characteristic can be set by the passenger 124 when hailing the autonomous vehicle 100, when initializing preferences in an account of the passenger 124, when modifying the preferences in the account of the passenger 124, or the like; however, the claimed subject matter is not so limited. According to another example, the characteristic of the indicator 114 outputted by the notification system 112 as controlled by the identification customization system 122 can be selected by the identification customization system 122. Following this example, the identification customization system 122 can cause data specifying the characteristic of the indicator 114 selected for the passenger 124 to be transmitted from the computing system 116. For instance, the data specifying the characteristic of the indicator 114 can be transmitted from the autonomous vehicle 100 to a computing device (e.g., a mobile computing device) of the passenger 124, such that the data can be presented (e.g., displayed or otherwise outputted) to the passenger 124.

Figure 2:
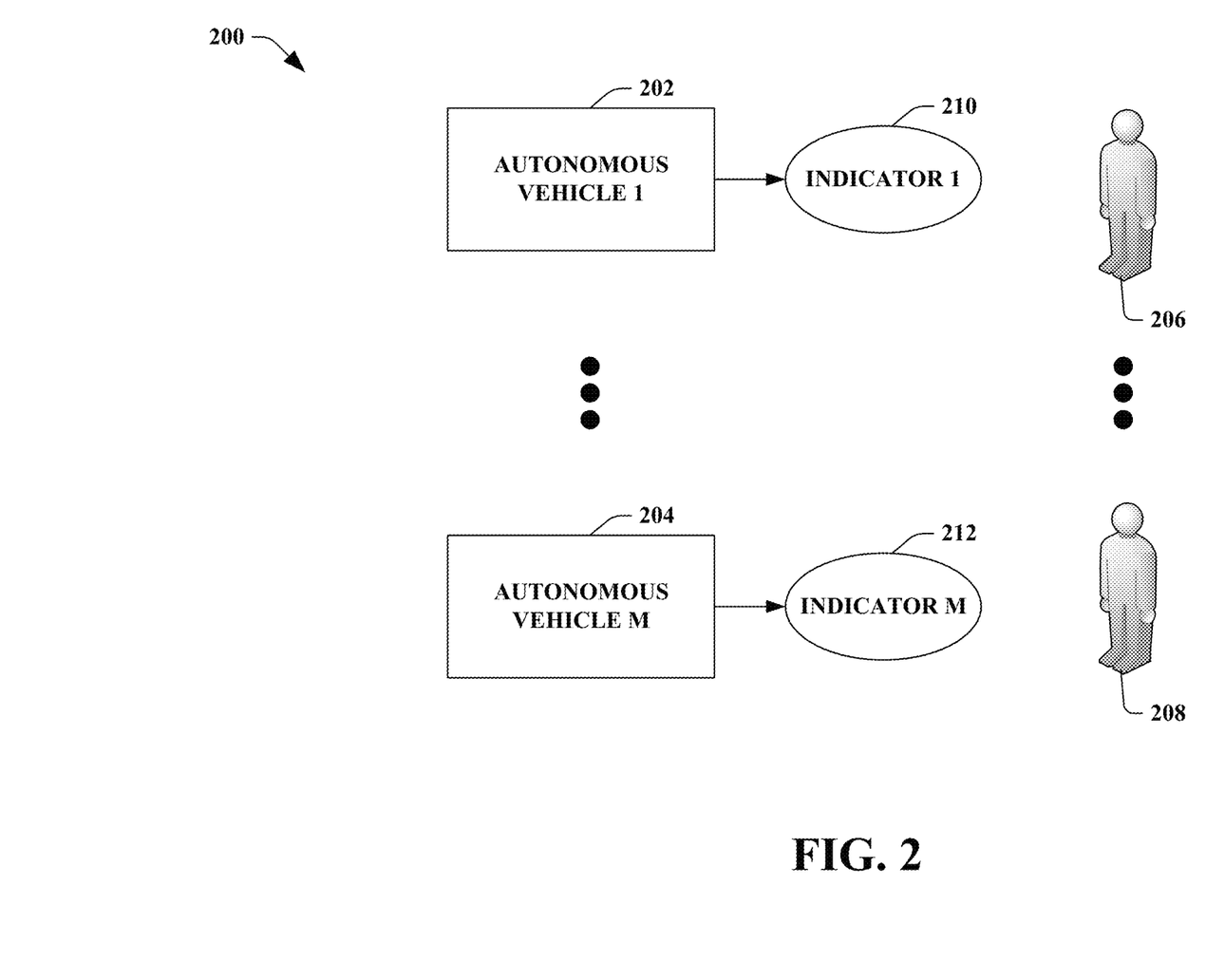
FIG. 2 illustrates an exemplary environment that includes a plurality of autonomous vehicles and a plurality of passengers to be picked up within geographic proximity.

Now turning to FIG. 2, illustrated is an exemplary environment 200 that includes a plurality of autonomous vehicles and a plurality of passengers to be picked up within geographic proximity. More particularly, the environment 200 includes an autonomous vehicle 1 202, . . . , and an autonomous vehicle M 204, where M can be substantially any integer greater than 1 (collectively referred to herein as autonomous vehicles 202-204). Moreover, the environment 200 includes a passenger 206, . . . , and a passenger 208 (collectively referred to herein as passengers 206-208). It is contemplated that the environment 200 can include M passengers 206-208, more than M passengers 206-208, or fewer than M passengers 206-208. By way of illustration, it is contemplated that the autonomous vehicle 1 202 can be the autonomous vehicle 100, and the remainder of the autonomous vehicles 202-204 can be substantially similar to the autonomous vehicle 100. Further following this illustration, it is to be appreciated that the passenger 206 can be the passenger 124.

With conventional approaches, it may be difficult for a passenger to discern which autonomous vehicle from a fleet of autonomous vehicles is assigned to the passenger. This is particularly problematic for autonomous vehicles as compared to human driven vehicles since there is no driver to provide feedback to aid in the identification of the autonomous vehicle to the passenger to be picked up by the autonomous vehicle. Moreover, with a plurality of autonomous vehicles in geographic proximity, the challenge of identifying the appropriate autonomous vehicle is made more difficult.

In contrast to conventional approaches, as set forth herein, the autonomous vehicles 202-204 can each output a corresponding indicator. For instance, the autonomous vehicle 1 202 can output an indicator 1 210, . . . , and the autonomous vehicle M 204 can output an indicator M 212. As described herein, the autonomous vehicle 1 202 controls a characteristic of the indicator 1 210 (e.g., based on the identity of the passenger 206 to be picked up by the autonomous vehicle 1 210 and whether the autonomous vehicle 1 210 is stopped for passenger pickup). The remaining autonomous vehicles 202-204 can similarly control characteristics of the indicators respectively outputted thereby. Accordingly, when in the environment 200 with a plurality of autonomous vehicles 202-204, the autonomous vehicle 1 202 can control the characteristic of the indicator 210 such that the passenger 206 to be picked up can distinguish that the autonomous vehicle 1 202 is to provide the ride to the passenger 206 and that the timing is appropriate (or not appropriate) for the passenger 206 to attempt to enter into the autonomous vehicle 1 202.

Figure 3:
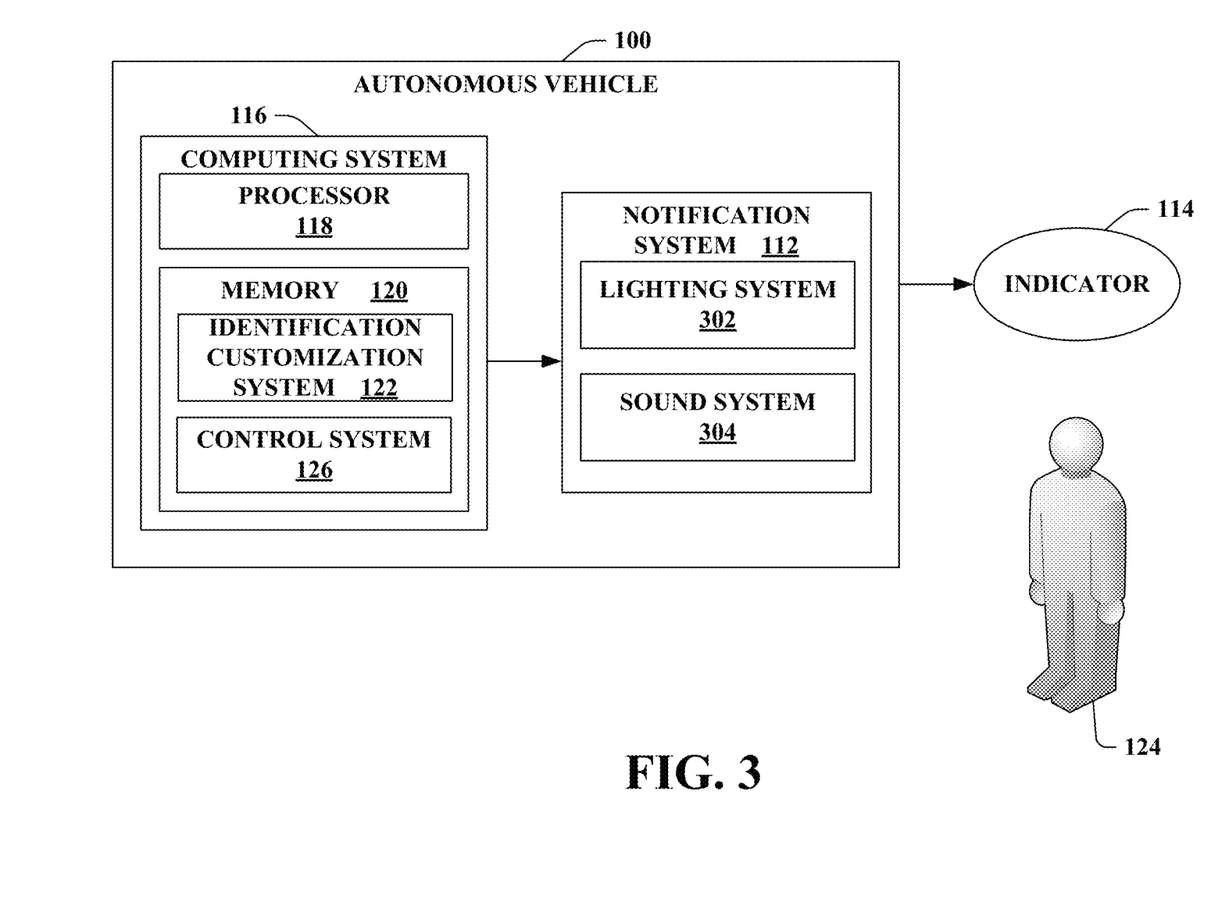
FIG. 3 illustrates a functional block diagram of an exemplary autonomous vehicle.

Now turning to FIG. 3, illustrated is the autonomous vehicle 100 in accordance with various embodiments. Again, the autonomous vehicle 100 includes the computing system 116 and the notification system 112. While not shown, it is to be appreciated that the autonomous vehicle 100 further includes the sensor systems 102-104 and the mechanical systems as described herein. As depicted in FIG. 3, the notification system 112 can include a lighting system 302 and a sound system 304; thus, the identification customization system 122 can control the lighting system 302 and/or the sound system 304 to output the indicator 114.

According to an example, the identification customization system 122 can cause the lighting system 302 to emit a visual indicator viewable external to the autonomous vehicle. A characteristic of the visual indicator controlled to be output by the lighting system 302 can be based on the identity of the passenger 124 to be picked up and whether the autonomous vehicle 100 is stopped for passenger pickup (e.g. as controlled by the control system 126). It is contemplated that the visual indicator can be displayed on the autonomous vehicle 100 (or a portion thereof) and/or nearby the autonomous vehicle 100 (e.g., the visual indicator can be projected by the lighting system 302 onto the ground nearby the autonomous vehicle 100).

The lighting system 302 can include substantially any number of lights that can be incorporated into or mounted upon the autonomous vehicle 100. The lights of the lighting system 302 can include substantially any type of lights (e.g., the lighting system 302 can include various light emitting diodes (LEDs)). It is contemplated that a subset of the lights of the lighting system 302 can emit the visual indicator at a given time, while a remainder of the lights of the lighting system 302 need not be illuminated (e.g., a light bar on one door of the autonomous vehicle 100 can be illuminated while a light bar on a differing door is not illuminated). The lights of the lighting system 302 can be color addressable. Moreover, according to an example, the lights of the lighting system 302 can emit light in a controllable direction from the autonomous vehicle 100. Further, is to be appreciated that the lights of the lighting system 302 can be located at substantially any location on the autonomous vehicle 100 (e.g., on a top of the autonomous vehicle 100 around a lidar sensor system, underneath the autonomous vehicle 100, on doors of the autonomous vehicle 100, on windows of the autonomous vehicle 100, on trim surrounding doors and/or windows of the autonomous vehicle 100).

Pursuant to an example, the characteristic of the visual indicator can be a color of the visual indicator. According to an illustration, the identification customization system 122 can cause the lighting system 302 to emit a pink light based on the identity of the passenger 124 to be picked up, whereas the identification customization 122 can cause a differing color light to be emitted by the lighting system 302 when the autonomous vehicle 100 is to be picking up a differing passenger other than the passenger 124. For instance, the passenger 124 may specify that a pink light be used. Alternatively, the identification customization system 122 can select that a pink light be used for the passenger 124, which may be communicated to a computing device of the passenger 124.

By way of illustration, the passenger 124 can specify a color for a visual indicator under the autonomous vehicle 100. Following this illustration, the identification customization system 122 can cause the lighting system 302 to emit the visual indicator under the autonomous vehicle 100 having such color when the autonomous vehicle 100 has pulled over and stopped for passenger pickup. The visual indicator can serve dual-purposes, namely, to identify to the passenger 124 that the autonomous vehicle 100 has pulled over, completely stopped, and will not move again until the passenger 124 enters into the autonomous vehicle 100 as well as to identify that the autonomous vehicle 100 is assigned to pick up the passenger 124 for a ride. The foregoing can help, particularly in high traffic areas, at night, and/or in a location at which a significant number of autonomous vehicles are within geographic proximity.

According to another example, the characteristic of the visual indicator can include a location of the visual indicator relative to the autonomous vehicle 100. For instance, the location can be on or near a particular door of the autonomous vehicle 100, on or near by a particular window of the autonomous vehicle 100, or the like. The location of the visual indicator can further be controlled by the identification customization system 122 based on a seat in the autonomous vehicle 100 for the passenger 124 to be picked up.

Pursuant to another example, the characteristic of the visual indicator can be an animation. For instance, a predefined animation can be set for the passenger 124. According to an illustration, the predefined animation for the passenger 124 can include marching green ants depicted by the lighting system 302 to be marching around the autonomous vehicle 100 when the autonomous vehicle 100 is stopped to pick up the passenger 124. Moreover, it is contemplated that common animations can be utilized for passengers (e.g., ants standing still prior to the autonomous vehicle 100 stopping and the ants marching after the autonomous vehicle 100 stops), whereas other characteristics of the visual indicator can be modified based on the identity of the passenger 124 to be picked up (e.g., pink versus yellow ants).

Pursuant to an illustration, an animation emitted by the lighting system 302 controlled by the identification customization system 122 can differ before and after the autonomous vehicle 100 has stopped for passenger pickup. For instance, prior to the control system 126 causing the vehicle propulsion system 106 and/or the braking system 108 to stop the autonomous vehicle 100 for passenger pickup, the animation emitted by the lighting system 302 can indicate to the passenger 124 to be picked up to wait while the autonomous vehicle 100 is still approaching the pickup location. Thereafter, subsequent to the control system 126 causing the mechanical system(s) of the autonomous vehicle 100 to stop the autonomous vehicle 100 for passenger pickup, the animation emitted by the lighting system 302 as controlled by the identification customization system 122 can signify that the timing is appropriate for the passenger 124 to enter into the autonomous vehicle 100.

Moreover, as noted above, the notification system 112 can include the sound system 304. Accordingly, the identification customization system 122 can cause the sound system 304 to emit an audible indicator perceivable external to the autonomous vehicle 100. A characteristic of the audible indicator can be controlled by the identification customization system 122 based on the identity of the passenger 124 to be picked up and whether the autonomous vehicle 100 is stopped for passenger pickup as controlled by the control system 126. According to an example, the characteristic of the audible indicator can be an identity of a song played by the sound system 304. For instance, the song may be streamed from a mobile computing device of the passenger 124 to be picked up (e.g., when the mobile computing device and the autonomous vehicle 100 are within a predetermined distance of each other, via a Wi-Fi network or some other wireless communications technology for pairing the mobile computing device with the sound system 304 of the autonomous vehicle 100); however, the claimed subject matter is not so limited. Further, it is to be appreciated that substantially any type of audible indicator other than songs can be emitted by the sound system 304 based on the emitting of the passenger 124 and the state of the autonomous vehicle 100.

Figure 4:
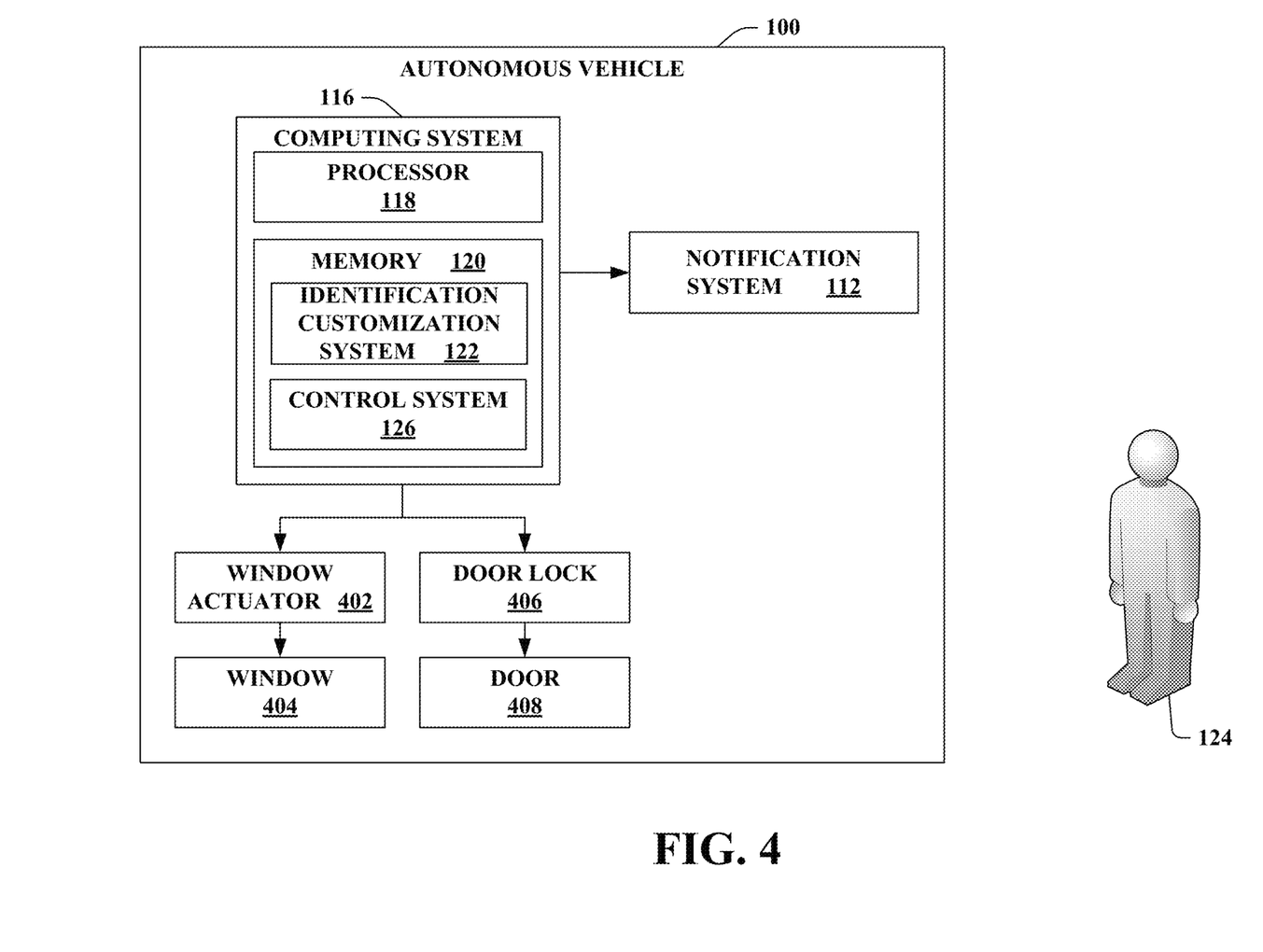
FIG. 4 illustrates a functional block diagram of an exemplary autonomous vehicle.

Referring to FIG. 4, illustrated is the autonomous vehicle 100 according to various embodiments. Again, the autonomous vehicle 100 includes the computing system 116 and the notification system 112 as well as the sensor systems 102-104 and the mechanical systems. The autonomous vehicle 100 further includes a window actuator 402, a window 404, a door lock 406, and a door 408. While a single window actuator, window, door lock, and door are depicted as being included as part of the autonomous vehicle 100, it is to be appreciated that substantially any number of window actuators, windows, door locks, and doors can be included in the autonomous vehicle (e.g., the autonomous vehicle 100 can include four window actuators, four windows, four door locks, and four doors).

Moreover, the computing system 116 can be in communication with the window actuator 402 and the door lock 406. The window actuator 402 can be configured to move the window 404 responsive to a signal received from the computing system 116. Further, the door lock 406 can be locked or unlocked responsive to a signal received from the computing system 116.

Pursuant to an example, the identification customization system 122 can control the window actuator 402 to lower the window 404 when the autonomous vehicle 100 is stopped for passenger pickup and the passenger 124 is within a predetermined distance from the autonomous vehicle 100. By way of illustration, the window actuator 402 controlled by the identification customization system 122 can be selected based upon a door in which the passenger 124 to be picked up is to enter into the autonomous vehicle 100 (e.g., the door 408). However, it is contemplated that a plurality of window actuators can be controlled by the identification customization system 112 to lower a plurality of windows when the autonomous vehicle 100 is stopped for passenger pickup and the passenger 124 is within the predetermined distance from the autonomous vehicle 100. Pursuant to yet another illustration, the identification customization system 112 can control window actuator(s) to lower window(s) based on a location of the passenger 124 to be picked up relative to the autonomous vehicle 100 (e.g., if the passenger 124 is standing outside the autonomous vehicle 100 on the left-hand side of the autonomous vehicle 100 then the window(s) on the left-hand side of the autonomous vehicle 100 can be lowered).

Moreover, as described herein, the notification system 112 can include the sound system 304. Accordingly, the identification customization system 122 can cause the sound system 304 to emit an audible indicator perceivable external to the autonomous vehicle 100 in conjunction with controlling the window actuator 402 to lower the window 404. For instance, the autonomous vehicle 100 can pull over for passenger pickup and the window 404 (or plurality of windows) can be lowered by the window actuator 402, while an audible indicator (e.g., a song) chosen by the passenger 124 can be played by the sound system 304.

According to an example, it is contemplated that the window lowering and the song playing can be unlocked based upon points or loyalty. For instance, after a number of rides in autonomous vehicles in a fleet by a passenger, such features may be available to the passenger. Moreover, according to another example, a trivia game can be conducted. Following this example, the passenger can select from a list of clues that each correspond to a song. The passenger can figure out the answer to the clues prior to the autonomous vehicle arriving, at which time the autonomous vehicle can lower a window and play the song.

Moreover, the identification customization system 122 can cause the door lock 406 to unlock when the passenger 124 is detected to be within a predetermined distance from the autonomous vehicle 100. Accordingly, the passenger 124 can enter into the autonomous vehicle 100 via the door 408 upon the door lock 406 being unlocked. It is contemplated that all doors of the autonomous vehicle 100 can be unlocked by the identification customization system 112 when the passenger 124 is within the predetermined distance or a particular door (or doors) can be unlocked by the identification customization system 112 when the passenger 124 is within the predetermined distance (e.g., the door to be entered by the passenger 124, based on seats available and/or assigned to the passenger 124).

Figure 5:
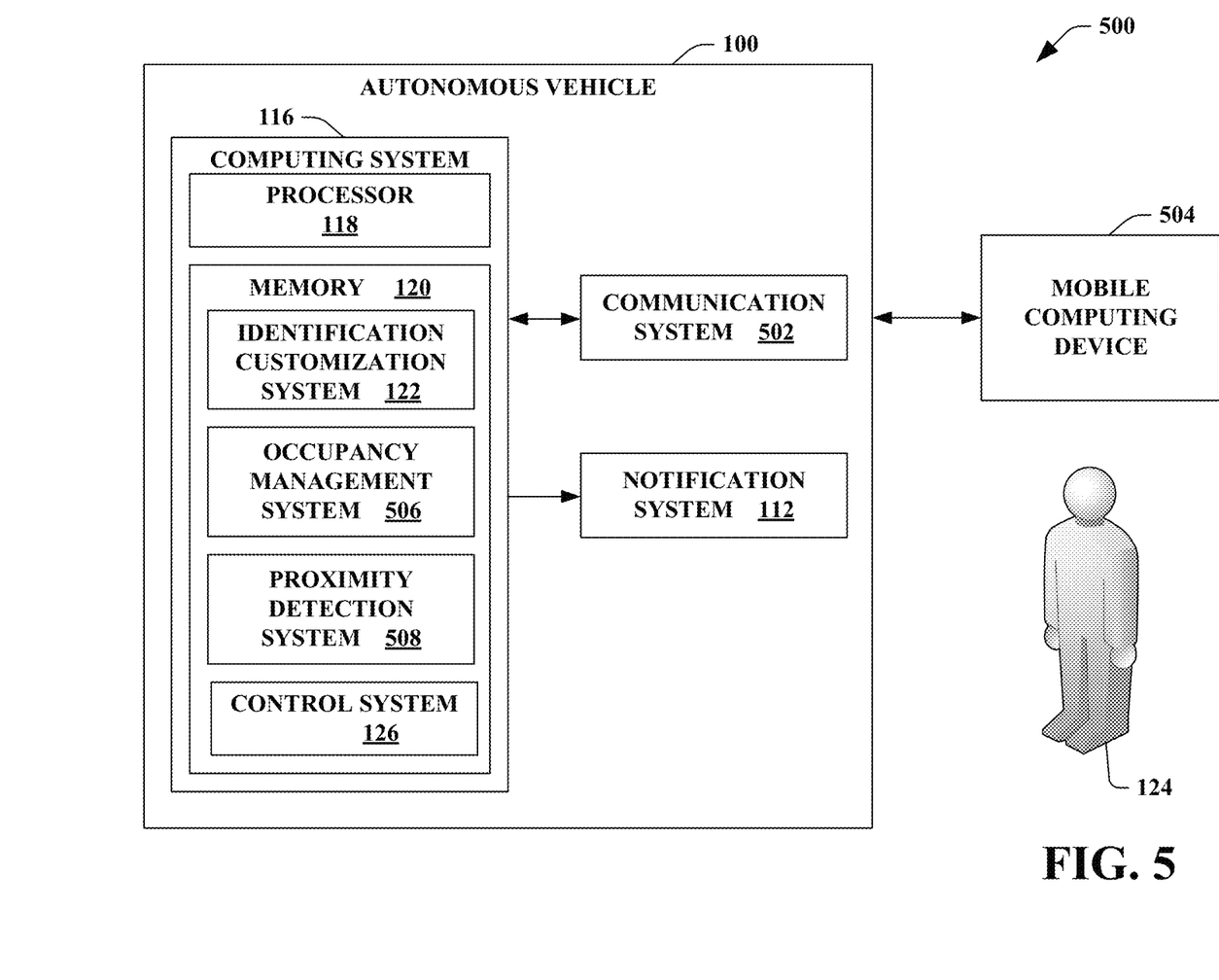
FIG. 5 illustrates a functional block diagram of an exemplary system that includes an autonomous vehicle.

Now turning to FIG. 5, illustrated is an exemplary system 500 that includes the autonomous vehicle 100. The autonomous vehicle 100 includes the computing system 116 and the notification system 112 (as well as the sensor systems 102-104 and the mechanical systems). The autonomous vehicle 100 further includes a communication system 502. Moreover, the system 500 includes a mobile computing device 504 (of the passenger 124 to be picked up). The communication system 502 of the autonomous vehicle 100 can transmit data to and receive data from the mobile computing device 504.

According to an illustration, data exchanged between the communication system 502 and the mobile computing device 504 can be sent via a Wi-Fi network. Following this illustration, the communication system 502 can enable zero-configuration services, where the mobile computing device 504 can be automatically paired to the autonomous vehicle 100 over a built-in Wi-Fi network without requiring a pairing process that involves action by the passenger 124 to be picked up. For instance, when paired to the autonomous vehicle 100, the mobile computing device 504 can be automatically paired to the sound system 304 of the autonomous vehicle 502 (e.g., to stream music from the mobile computing device 504 to speakers of the sound system 304). Further, the music streamed from the mobile computing device 504 can be tied to cabin mood lights that, for instance, can pulse lights and/or change colors of lights in the cabin for an enhanced used experience; yet, the claimed subject matter is not so limited. Moreover, it is to be appreciated that substantially any type of wireless communication technology in addition to or instead of a Wi-Fi network can be utilized to exchange data between the communication system 502 of the autonomous vehicle 100 and the mobile computing device 504. It is also contemplated that data can be routed via substantially any number and/or type of intermediary nodes (e.g., via a central server).

As depicted, the memory 120 of the computing system 116 can include the identification customization system 122 and the control system 126. The memory 120 can further include an occupancy management system 506 configured to track seat availability within the autonomous vehicle 100. Accordingly, in a ride sharing environment, passenger(s) already in the autonomous vehicle 100 (if any) can be detected by the occupancy management system 506. Moreover, the identification system 122 can cause the notification system 112 to output an indicator (e.g., the indicator 114) such that a characteristic of the indicator specifies a particular door of the autonomous vehicle 100 for entry into the autonomous vehicle 100 by the passenger 124 to be picked up. The particular door of the autonomous vehicle 100 for entry by the passenger 124 can be selected by the occupancy management system 506 based upon current occupancy within the autonomous vehicle 100. According to an illustration, lights on an inside trim of a door or window can be caused to be illuminated by the identification customization system 122 when a seat inside such door is free in the autonomous vehicle 100. Thus, an area or seat available for the passenger 124 to be picked up can be specified via the notification system 112.

According to another example, is to be appreciated that the occupancy management system 502 can assign seats within the autonomous vehicle 100 in a carpool situation. Following this example, the identification customization system 122 can control the characteristic of the indicator outputted by the notification system 112 based upon the seat assignment.

Thus, the occupancy management system 502 can select a particular door for entry into the autonomous vehicle 100 based on the seat availability in the autonomous vehicle 100 and/or the seat assignment for the passenger 124 to be picked up. As described above, a location of a visual indicator relative to the autonomous vehicle 100 can be controlled based on the seat in the autonomous vehicle 100 available for and/or assigned to the passenger 124 to be picked up. For instance, a characteristic of the visual indicator can specify the particular door of the autonomous vehicle 100 for entry into the autonomous vehicle 100 by the passenger 124 to be picked up.

Figure 6:
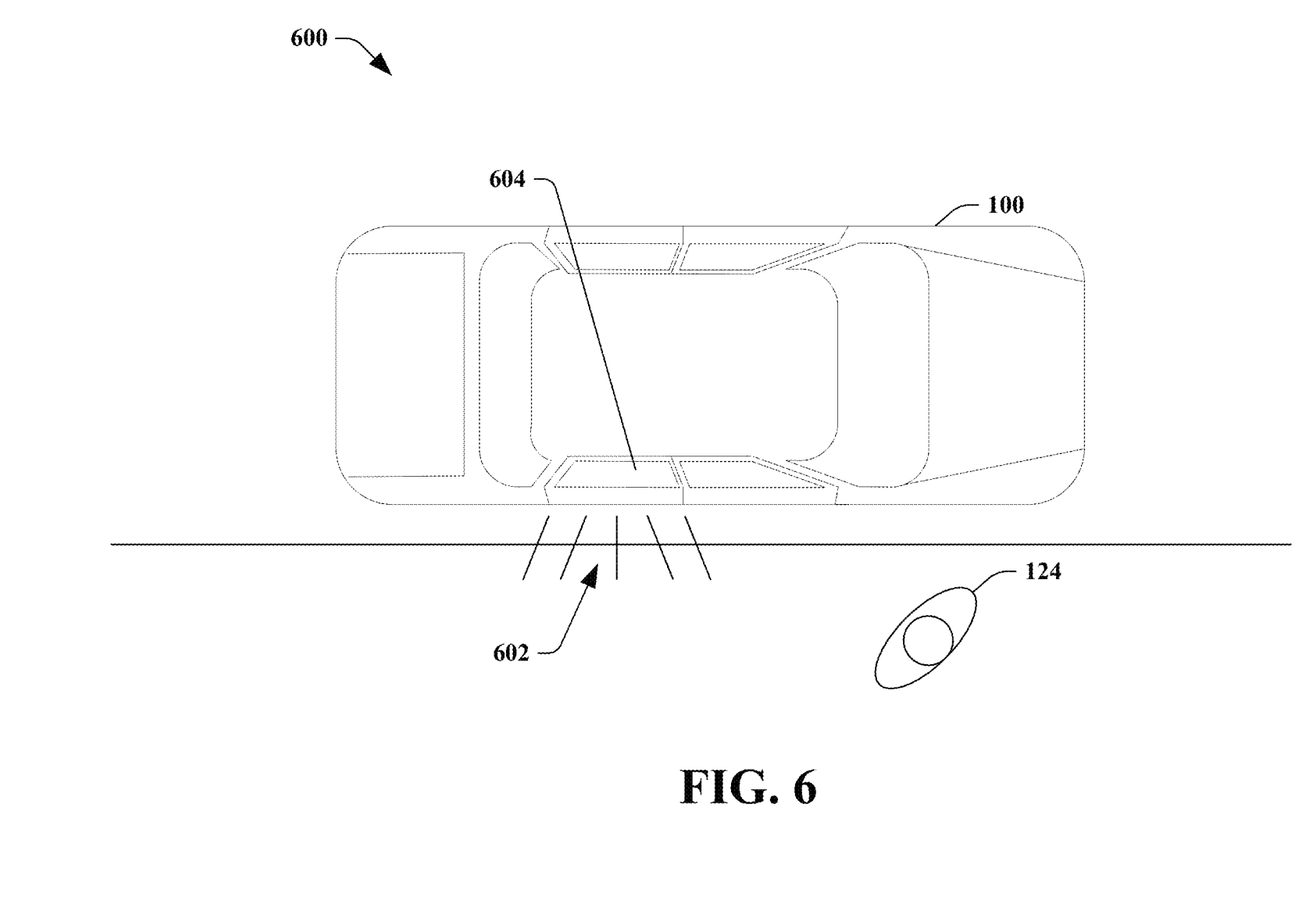
FIG. 6 illustrates an exemplary environment that includes an autonomous vehicle and a passenger to be picked up.

FIG. 6 illustrates an exemplary environment 600 that includes the autonomous vehicle 100 and the passenger 124 to be picked up. As shown, an indicator 602 can be outputted by the autonomous vehicle 100 to signify to the passenger 124 to be picked up that the passenger 124 is to enter into a particular door 604 (e.g., as selected by the occupancy management system 502). It is contemplated that the indicator 602 can be a visual indicator viewable external to the autonomous vehicle 100, however, the claimed subject matter is not so limited. For instance, it is contemplated that a window of the particular door 604 can additionally or alternatively be lowered to signify to the passenger 124 to enter into the particular door 604.

Reference is again made to FIG. 5. The memory 120 of the computing system 116 can further include a proximity detection system 508 configured to detect a distance between the autonomous vehicle 100 and the passenger 124 to be picked up. It is to be appreciated that the proximity detection system 508 can detect the passenger 124 to be picked up in substantially in any manner (e.g., via facial recognition, based on a signal received from the mobile computing device 504 of the passenger 124 to be picked up). According to another example, it is contemplated that the passenger 124 may carry a keypass that can be utilized by the proximity detection system 508 to detect the distance between the autonomous vehicle 100 and the passenger 124 to be picked up. Moreover, a characteristic of an indicator outputted by the notification system 112 can be controlled by the identification customization system 122 based on the distance between the autonomous vehicle 100 and the passenger 124 to be picked up.

According to an illustration, the proximity detection system 508 can detect whether the passenger 124 to be picked up is within a predetermined distance from the autonomous vehicle 100. The identification customization system 122 can control a window actuator (e.g., the window actuator 402) to lower a window (e.g., the window 404) when the autonomous vehicle 100 is stopped for passenger pickup and the passenger 124 to be picked up is detected by the proximity detection system 508 to be within the predetermined distance from the autonomous vehicle 100. Additionally or alternatively, a door lock (e.g., the door lock 406) of a door (e.g., the door 408) can be unlocked by the identification customization system 122 when the autonomous vehicle 100 is stopped for passenger pickup and the passenger 124 to be picked up is detected by the proximity detection system 508 to be within the predetermined distance from the autonomous vehicle 100.

Figure 7:
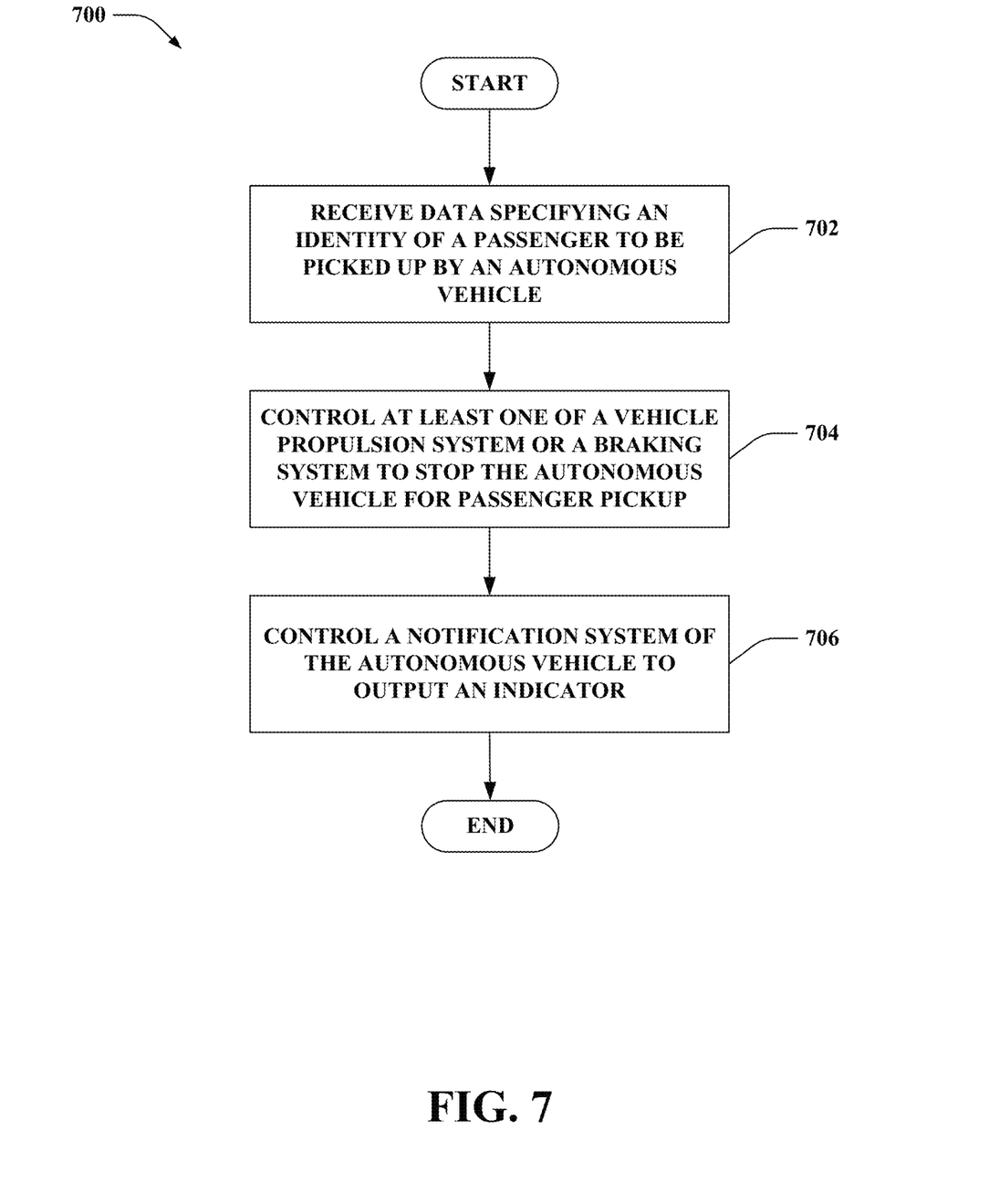
FIG. 7 is a flow diagram that illustrates an exemplary methodology performed by an autonomous vehicle to provide an indicator to distinguish the autonomous vehicle.
Figure 8:
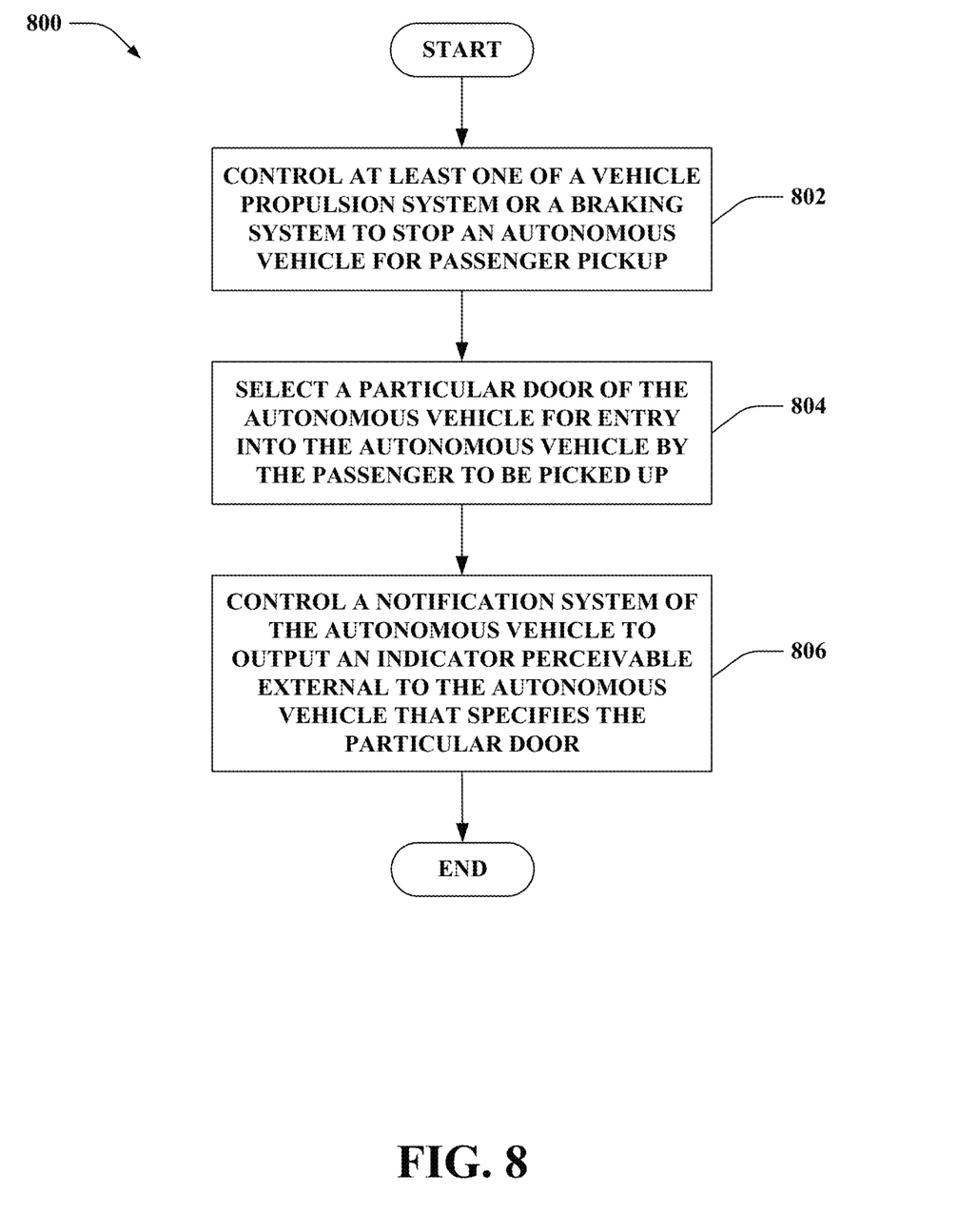
FIG. 8 is a flow diagram that illustrates another exemplary methodology performed by an autonomous vehicle to provide an indicator to distinguish the autonomous vehicle.

FIGS. 7-8 illustrate exemplary methodologies relating to controlling an autonomous vehicle to provide an indicator to distinguish the autonomous vehicle from other autonomous vehicles in a fleet. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 performed by an autonomous vehicle to provide an indicator to distinguish the autonomous vehicle. At 702, data specifying an identity of a passenger to be picked up can be received by the autonomous vehicle. At 704, at least one of a vehicle propulsion system of the autonomous vehicle or a braking system of the autonomous vehicle can be controlled to stop the autonomous vehicle for passenger pickup. At 706, a notification system of the autonomous vehicle can be controlled to output an indicator. A characteristic of the indicator outputted by the notification system can be controlled based on the identity of the passenger to be picked up and whether the autonomous vehicle is stopped for passenger pickup. For instance, the notification system can include a lighting system; thus, the lighting system can be controlled to emit a visual indicator viewable external to the autonomous vehicle. Additionally or alternatively, the notification system can include a sound system; the sound system can be controlled to emit an audible indicator perceivable external to the autonomous vehicle.

Turning to FIG. 8, illustrated is another methodology 800 performed by an autonomous vehicle to provide an indicator to distinguish the autonomous vehicle. At 802, at least one of a vehicle propulsion system of the autonomous vehicle or a braking system of the autonomous vehicle can be controlled to stop the autonomous vehicle for passenger pickup. Data specifying an identity of the passenger to be picked up by the autonomous vehicle can be received by the autonomous vehicle. At 804, a particular door of the autonomous vehicle can be selected for entry into the autonomous vehicle by the passenger to be picked up. The particular door can be selected based on seat availability in the autonomous vehicle for the passenger to be picked up. At 806, a notification system of the autonomous vehicle can be controlled to output an indicator perceivable external to the autonomous vehicle. The indicator can specify the particular door of the autonomous vehicle for entry into the autonomous vehicle by the passenger to be picked up. Moreover, a characteristic of the indicator outputted by the notification system can be controlled based on the identity of the passenger to be picked up and whether the autonomous vehicle is stopped for passenger pickup.

Figure 9:
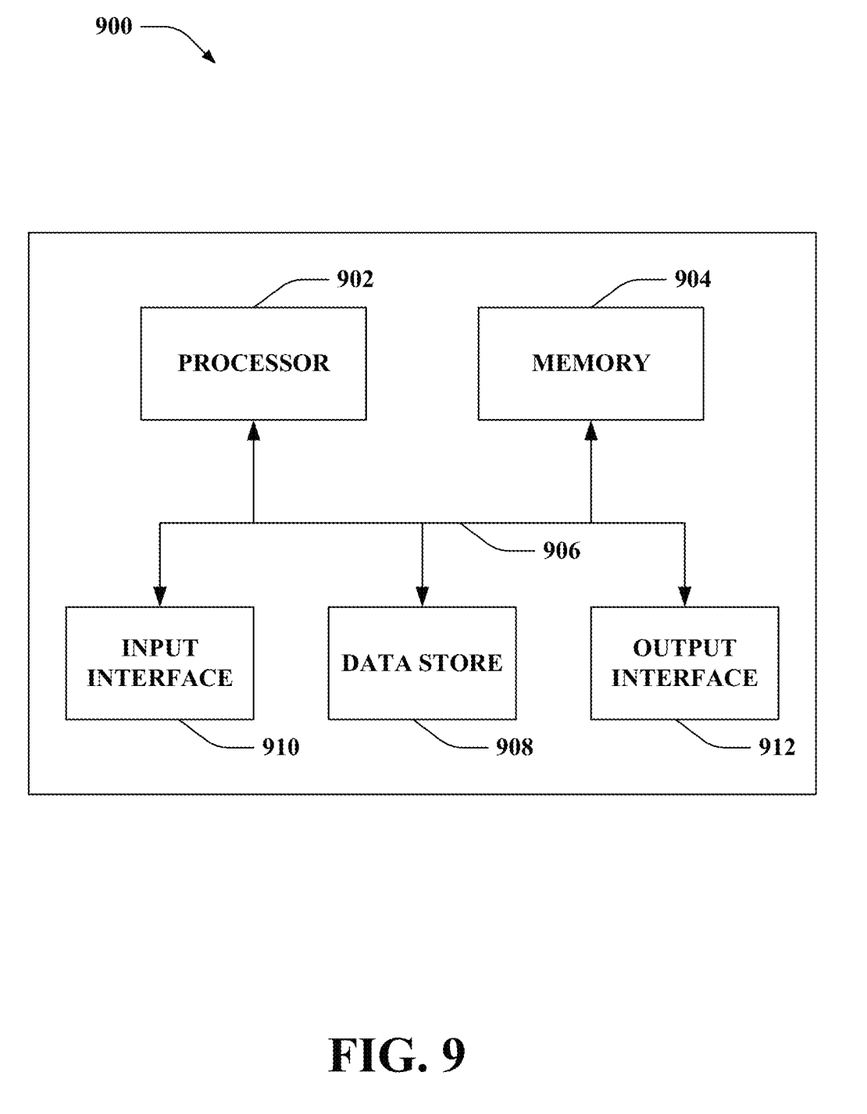
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be or include the computing system 116. The computing device 900 includes at least one processor 902 that executes instructions that are stored in a memory 904. The instructions may be, for instance, instructions for implementing functionality described as being carried out by one or more systems discussed above or instructions for implementing one or more of the methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store passenger data, vehicle occupancy data, data specifying characteristics of indicators, and so forth.

The computing device 900 additionally includes a data store 908 that is accessible by the processor 902 by way of the system bus 906. The data store 908 may include executable instructions, passenger data, vehicle occupancy data, data specifying characteristics of indicators, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
a vehicle propulsion system;
a braking system;
a notification system, the notification system comprises a sound system configured to output an audible indicator, the audible indicator being perceivable from a position external to the autonomous vehicle; and
a computing system that is in communication with the vehicle propulsion system, the braking system, and the notification system, wherein the computing system comprises:
a processor; and
memory that stores computer-executable instructions that, when executed by the processor, cause the processor to perform acts comprising:
receiving data specifying an identity of a passenger to be picked up by the autonomous vehicle;
controlling at least one of the vehicle propulsion system or the braking system to cause the autonomous vehicle to stop for passenger pickup; and
controlling the notification system of the autonomous vehicle to output the audible indicator, one or more characteristics of the audible indicator outputted by the notification system being controlled based on the identity of the passenger to be picked up and a state of the autonomous vehicle, the one or more characteristics of the audible indicator comprise an identity of a song chosen by the passenger to be picked up, wherein the state of the autonomous vehicle comprises one of:
the autonomous vehicle being stopped for passenger pickup during a time period appropriate for the passenger to enter the autonomous vehicle; or
the autonomous vehicle not being stopped for passenger pickup.

2. The autonomous vehicle of claim 1, the one or more characteristics of the audible indicator being predefined by the passenger to be picked up.

3. The autonomous vehicle of claim 1, the one or more characteristics of the audible indicator outputted by the notification system further being controlled based on a distance between the autonomous vehicle and the passenger to be picked up.

4. The autonomous vehicle of claim 1, the notification system further comprises a lighting system configured to emit a visual indicator viewable from the position external to the autonomous vehicle, wherein the notification system of the autonomous vehicle is further controlled to output the visual indicator, and wherein one or more characteristics of the visual indicator are controlled based on the identity of the passenger to be picked up and the state of the autonomous vehicle.

5. The autonomous vehicle of claim 4, the one or more characteristics of the visual indicator comprise a color of the visual indicator.

6. The autonomous vehicle of claim 4, the one or more characteristics of the visual indicator comprise a location of the visual indicator relative to the autonomous vehicle.

7. The autonomous vehicle of claim 6, the location of the visual indicator relative to the autonomous vehicle further being controlled based on a seat in the autonomous vehicle available for the passenger to be picked up.

8. The autonomous vehicle of claim 4, the one or more characteristics of the visual indicator comprise an animation.

9. The autonomous vehicle of claim 1, the one or more characteristics of the audible indicator being controlled to differ when the autonomous vehicle is stopped for passenger pickup as compared to when the autonomous vehicle is not stopped for passenger pickup.

10. The autonomous vehicle of claim 1, further comprising:
a window; and
a window actuator, the window actuator configured to move the window;
wherein the computing system is further in communication with the window actuator; and
wherein the memory further stores computer-executable instructions that, when executed by the processor, cause the processor to perform acts comprising:
controlling the window actuator to lower the window when the autonomous vehicle is stopped for passenger pickup and the passenger to be picked up is within a predetermined distance from the autonomous vehicle.

11. The autonomous vehicle of claim 10, wherein the sound system is configured to emit the audible indicator perceivable from the position external to the autonomous vehicle when the window is lowered.

12. A method performed by an autonomous vehicle, the method comprising:
receiving data specifying an identity of a passenger to be picked up by the autonomous vehicle;
controlling at least one of a vehicle propulsion system of the autonomous vehicle or a braking system of the autonomous vehicle to cause the autonomous vehicle to stop for passenger pickup; and controlling a sound system of the autonomous vehicle to emit an audible indicator perceivable from a position external to the autonomous vehicle, one or more characteristics of the audible indicator being controlled based on the identity of the passenger and a state of the autonomous vehicle, the one or more characteristics of the audible indicator comprise an identity of a song chosen by the passenger to be picked up, wherein the state of the autonomous vehicle comprises one of:
  the autonomous vehicle being stopped for passenger pickup during a time period appropriate for the passenger to enter the autonomous vehicle; or
  the autonomous vehicle not being stopped for passenger pickup.

13. The method of claim 12, further comprising:
controlling a lighting system of the autonomous vehicle to emit a visual indicator viewable from a position external to the autonomous vehicle, one or more characteristics of the visual indicator being controlled based on the identity of the passenger and the state of the autonomous vehicle.

14. The method of claim 13, the one or more characteristics of the visual indicator comprise at least one of:
a color of the visual indicator;
a location of the visual indicator relative to the autonomous vehicle; or
an animation.

15. The method of claim 13, the one or more characteristics of the visual indicator specifies a particular door of the autonomous vehicle for entry into the autonomous vehicle by the passenger to be picked up.

16. The method of claim 15, further comprising:
selecting the particular door based on a seat availability in the autonomous vehicle for the passenger to be picked up.

17. The method of claim 12, further comprising:
detecting whether the passenger to be picked up is within a predetermined distance from the autonomous vehicle; and
controlling a window actuator of the autonomous vehicle to lower a window of the autonomous vehicle when the autonomous vehicle is stopped for passenger pickup and the passenger to be picked up is detected to be within the predetermined distance from the autonomous vehicle.

18. An autonomous vehicle, comprising:
a computer-readable storage medium that comprises instructions that, when executed by one of more processors, cause the one or more processors to perform actions comprising:
  controlling at least one of a vehicle propulsion system of the autonomous vehicle or a braking system of the autonomous vehicle to cause the autonomous vehicle to stop for passenger pickup, wherein data specifying an identity of a passenger to be picked up by the autonomous vehicle is received by the autonomous vehicle;
  selecting a particular door of the autonomous vehicle for entry into the autonomous vehicle by the passenger to be picked up, the particular door being selected based on seat availability in the autonomous vehicle for the passenger to be picked up; and
  controlling a sound system of the autonomous vehicle to output an audible indicator perceivable from a position external to the autonomous vehicle, wherein the audible indicator specifies the particular door of the autonomous vehicle for entry into the autonomous vehicle by the passenger to be picked up, wherein one or more characteristics of the audible indicator outputted by the sound system is controlled based on the identity of the passenger to be picked up and a state of the autonomous vehicle, wherein the one or more characteristics of the audible indicator comprise an identity of a song chosen by the passenger to be picked up, and wherein the state of the autonomous vehicle comprises one of:
    the autonomous vehicle being stopped for passenger pickup during a time period appropriate for the passenger to enter the autonomous vehicle; or
    the autonomous vehicle not being stopped for passenger pickup.

19. The autonomous vehicle of claim 18, the computer-readable storage medium further comprises instructions that, when executed by the one of more processors, cause the one or more processors to perform actions comprising:
controlling a lighting system of the autonomous vehicle to emit a visual indicator viewable from a position external to the autonomous vehicle, one or more characteristics of the visual indicator being controlled based on the identity of the passenger and the state of the autonomous vehicle.

20. The autonomous vehicle of claim 18, the computer-readable storage medium further comprises instructions that, when executed by the one of more processors, cause the one or more processors to perform actions comprising:
detecting whether the passenger to be picked up is within a predetermined distance from the autonomous vehicle; and
controlling a window actuator of the autonomous vehicle to lower a window of the autonomous vehicle of the particular door when the autonomous vehicle is stopped for passenger pickup and the passenger to be picked up is detected to be within the predetermined distance from the autonomous vehicle.

\* \* \* \* \*